United States Patent
Strine et al.

(10) Patent No.: US 8,947,529 B2
(45) Date of Patent: Feb. 3, 2015

(54) METHODS AND SYSTEMS FOR STABILIZING LIVE VIDEO IN THE PRESENCE OF LONG-TERM IMAGE DRIFT

(71) Applicant: Siemens Industry, Inc., Alpharetta, GA (US)

(72) Inventors: Lloyd Strine, Roswell, GA (US); Jeffrey Bragg, Marietta, GA (US); Aaron Bobick, Alpharetta, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 14/269,600

(22) Filed: May 5, 2014

(65) Prior Publication Data

US 2014/0240496 A1 Aug. 28, 2014

Related U.S. Application Data

(63) Continuation of application No. 13/249,412, filed on Sep. 30, 2011, now Pat. No. 8,760,513.

(51) Int. Cl.
| | |
|---|---|
| H04N 7/18 | (2006.01) |
| G06T 15/00 | (2011.01) |
| H04N 5/232 | (2006.01) |
| G06T 7/20 | (2006.01) |

(52) U.S. Cl.
CPC .............. *H04N 5/23267* (2013.01); *G06T 7/20* (2013.01); *H04N 7/183* (2013.01); *G06T 2207/30232* (2013.01)
USPC .......................................... 348/143; 345/419

(58) Field of Classification Search
CPC ......................... G06T 7/20; G06T 2207/30232
USPC .......................................... 348/143
See application file for complete search history.

(56) References Cited

U.S. PATENT DOCUMENTS

| | | | | |
|---|---|---|---|---|
| 5,524,131 A | * | 6/1996 | Uzawa et al. | 378/34 |
| 5,629,988 A | | 5/1997 | Burt et al. | |
| 5,822,389 A | * | 10/1998 | Uzawa et al. | 378/34 |

(Continued)

FOREIGN PATENT DOCUMENTS

WO WO-2009/067819 6/2009

OTHER PUBLICATIONS

Marcenaro, Lucio et al., "Image Stabilization Algorithms for Video-Surveillance Applications", *University of Genoa, Italy*, 349-352, 4 pgs.

(Continued)

*Primary Examiner* — Hee-Yong Kim

(57) ABSTRACT

Methods and systems stabilization of a camera image for short term or 'pole shake' and longer term 'pole drift' are provided. The camera is attached to a fixed structure. The pole drift is over periods of times long enough that the imagery can change significantly between a base reference frame and the current stabilized transient frame. A multitude of mapped frames and associated information is maintained. The slowly varying camera orientation ("pole drift") is decoupled from the rapid motion jitter ("pole shake"), and separate transformations are calculated for each. Up to three transformations may be combined together for any one input frame. The separate transformations are combined together, so that only one full-blown image transformation computation is performed for each frame. A surveillance system applies a stabilization method.

20 Claims, 10 Drawing Sheets

(56) References Cited

U.S. PATENT DOCUMENTS

| | | |
|---|---|---|
| 6,985,620 B2 | 1/2006 | Sawhney et al. |
| 7,006,711 B2 | 2/2006 | Dresevic et al. |
| 7,236,176 B2 | 6/2007 | Milinusic |
| 7,313,252 B2 | 12/2007 | Matei et al. |
| 7,486,318 B2 | 2/2009 | Ohki |
| 7,526,401 B2 | 4/2009 | Krumm |
| 7,702,131 B2 | 4/2010 | Chinen et al. |
| 7,822,228 B2 | 10/2010 | Hampapur et al. |
| 2001/0010542 A1 | 8/2001 | Takagi et al. |
| 2004/0075738 A1 | 4/2004 | Burke et al. |
| 2004/0169617 A1 | 9/2004 | Yelton et al. |
| 2004/0207729 A1 | 10/2004 | Takagi et al. |
| 2006/0061658 A1 | 3/2006 | Faulkner et al. |
| 2006/0159308 A1 | 7/2006 | Hampapur et al. |
| 2006/0232581 A1 | 10/2006 | Chen |
| 2008/0030585 A1 | 2/2008 | Grigorian et al. |
| 2008/0158361 A1 | 7/2008 | Itoh et al. |
| 2008/0267453 A1 | 10/2008 | Avrahami |
| 2009/0225200 A1 | 9/2009 | Ohki |
| 2010/0157070 A1 | 6/2010 | Mohanty et al. |
| 2010/0171656 A1* | 7/2010 | Zhang ................ 342/357.09 |
| 2010/0296704 A1 | 11/2010 | Hampapur et al. |
| 2011/0134329 A1 | 6/2011 | Chen et al. |
| 2013/0202197 A1 | 8/2013 | Reeler et al. |

OTHER PUBLICATIONS

Morris, Daniel D. et al., "Image-Based Motion Stabilization for Maritime Surveillance", *SPIE*, vol. 6497 Feb. 27, 2007, 9 pgs.
Vermeulen, Eddy, "Real-time Video Stabilization for Moving Platforms", *21st Bristol UAV Systems Conference* Apr. 2007, 14 pgs.
White, Brandyn, "Using FPGAs to Perform Embedded Image Registration", *University of Central Florida* Mar. 2008, 1-5, 5 pgs.
PCT International Search Report and Written Opinion in PCT/US2012/056021, mailed Dec. 6, 2012, 10 pgs.
Kim, Soo W. et al., "Recovery Video Stabilization Using MRF-MAP Optimization", *2010 International Conference on Pattern Recognition*, 2804-2807, 4 pgs.
Ristivojevic, Mirko et al., "Multi-frame motion detection for active/unstable cameras", *XXII Brazilian Symposium on Computer Graphics and Image Processing*, 284-290, 8 pgs.
Wang, Yuan-Kai, et al, Real-Tome Camera Anomaly Detection for Real-World Video Surveillance, *Proceedings of the 2011 International Conference on Machine Learning and* Cybernetics, Jul. 2011, 1520-1525, 6 pgs.

* cited by examiner

METHODS AND SYSTEMS FOR STABILIZING LIVE VIDEO IN THE PRESENCE OF LONG-TERM IMAGE DRIFT

CROSS REFERENCE TO RELATED APPLICATIONS

The present application is a continuation of and claims the benefit of U.S. patent application Ser. No. 13/249,412 filed on Sep. 30, 2011 which is incorporated herein by reference in its entirety.

TECHNICAL FIELD

The present invention relates to systems and methods for video surveillance and more specifically to compensating in video images for long-term position change of a surveillance camera.

BACKGROUND

The present invention is generally related to a security surveillance system and more particularly to a security surveillance system containing cameras mounted on tall, outdoor poles or other constructions, where wind, thermal and other effects operating on the pole or the construction may cause the exact location and orientation of the camera(s) to change over time. These changes in camera pose are caused by a combination of longer-term, lower-frequency effects (e.g., thermal) and shorter-term, higher-frequency effects (e.g., wind). The term "pole drift" is used herein to denote the longer-term effects, and the term "pole shake" is used to denote shorter term effects.

Image stabilization in video surveillance systems compensates for camera motion for instance caused by wind and vibration effects on the cameras' mounting poles. This compensated camera motion is generally (relatively) high-frequency and translates into apparent pixel motion in the video stream, which in turn will cause false alarms and the detection of large numbers of "spurious" objects. In reality, of course, it is often the camera and not the world that is moving. Tuning the system's motion detection sensitivity parameters so that this motion is filtered out typically also causes much legitimate motion to be filtered out. Most image stabilization algorithms attempt to compensate for this kind of short term pole-induced camera motion.

Camera mounting poles or other mounting structures are also subject to longer-term, lower-frequency effects that will, over the course of minutes or hours, disturb the position and orientation of their attached cameras. The mounting structures in one embodiment of the present invention are substantially fixed or static relative to the ground or a building to which the structure is attached. Under unchanging conditions, a camera that is held by such a structure would generate an image that is stable relative to its environment. Thermal effects such as the heating and cooling of the pole by the sun or absence thereof—are one obvious source of pole motion, which may be relatively slow or longer term effects. Wind and passing heavy vehicles close to a structure for instance, may be a source for fast moving and shorter term effects. However, other effects which may be seasonal, ageing related or based on slow movement of the environment and that affect in a longer term manner a surveillance image are also fully contemplated and can be addressed by the methods and systems provided herein.

These effects operate relatively slowly; generally, they operate beneath the visual threshold of an observer watching video and usually are so slow that they do not significantly affect motion detection. These effects may be cyclical in nature. They may also be permanent.

Aspects of the present invention can address cyclical as well as non-cyclical effects. For instance a non-cyclical effect may be a slow settlement of a new structure to a permanent position. This may be a saturation effect wherein settlement takes place over days or weeks.

Video surveillance systems that convert two-dimensional image data to three-dimensional world data are very affected by these longer-term effects. These longer-term effects actually shift the camera view relative to the camera view at the time the image-to-world coordinate mapping was established and thus can have a large impact on image-to-world coordinate calculations. The system thus loses its ability to accurately place image-plane objects in the real three dimensional world, since the pixels corresponding to the object's location in the image plane no longer represent its correct location in the three-dimensional world.

Accordingly, novel and improved methods and systems that compensate for short term and longer term movement of a camera such as a surveillance camera held on structure, relative to its surveillance environment are required.

SUMMARY OF THE INVENTION

Systems and methods for stabilizing live video in the presence of long-term image drift are provided.

In accordance with an aspect of the present invention, a surveillance system, includes one or more cameras for generating a plurality of frames of video, a memory to store the plurality of frames of video, a processor in communication with the memory to process each of the plurality of frames of video by: (1) receiving a frame in the plurality of frames of video; (2) determining a transient transformation which transforms the frame to a transient coordinate system related derived from a transient frame; (3) determining a base transformation which transforms the transient coordinate system to a base coordinate system derived from a base frame; (4) determining a combined transformation that combines the transient and the base transformation; and (5) performing the combined transformation on the frame.

The surveillance system can also include a processor that extracts a feature from the frame. In accordance with another aspect of the present invention, the transient transformation transforms the feature in the frame to the feature in a transient frame.

In accordance with a further aspect of the present invention, the transient frame is updated during operation of the surveillance system with the frame.

In accordance with another aspect of the present invention, the frame is selected as an updated transient frame based on a bias detection.

In accordance with a further aspect of the present invention, the base frame transformation is determined during a setup phase of the surveillance system.

In accordance with a further aspect of the present invention, the transient transformation corrects for high frequency effects such as pole shaking.

In accordance with a further aspect of the present invention, the base frame transformation corrects for slower acting effects such as thermal variations.

In accordance with another aspect of the present invention, an updated transient frame cannot be transformed to the base frame and is stored in the memory for later processing.

In accordance with a further aspect of the present invention, at least one of the one or more cameras is attached to a static structure which experiences environmentally caused movement which is not larger than a field-of-vision of the at least one of the one or more cameras.

In accordance with a further aspect of the present invention, the combined transformation combines an updated transient transformation of the frame to the updated transient frame, a transformation of the updated transient frame to a previous transient frame and a transformation of the previous transient frame to the base frame.

Corresponding methods are also provided in accordance with various aspects of the present invention.

DESCRIPTION

Figure 1:
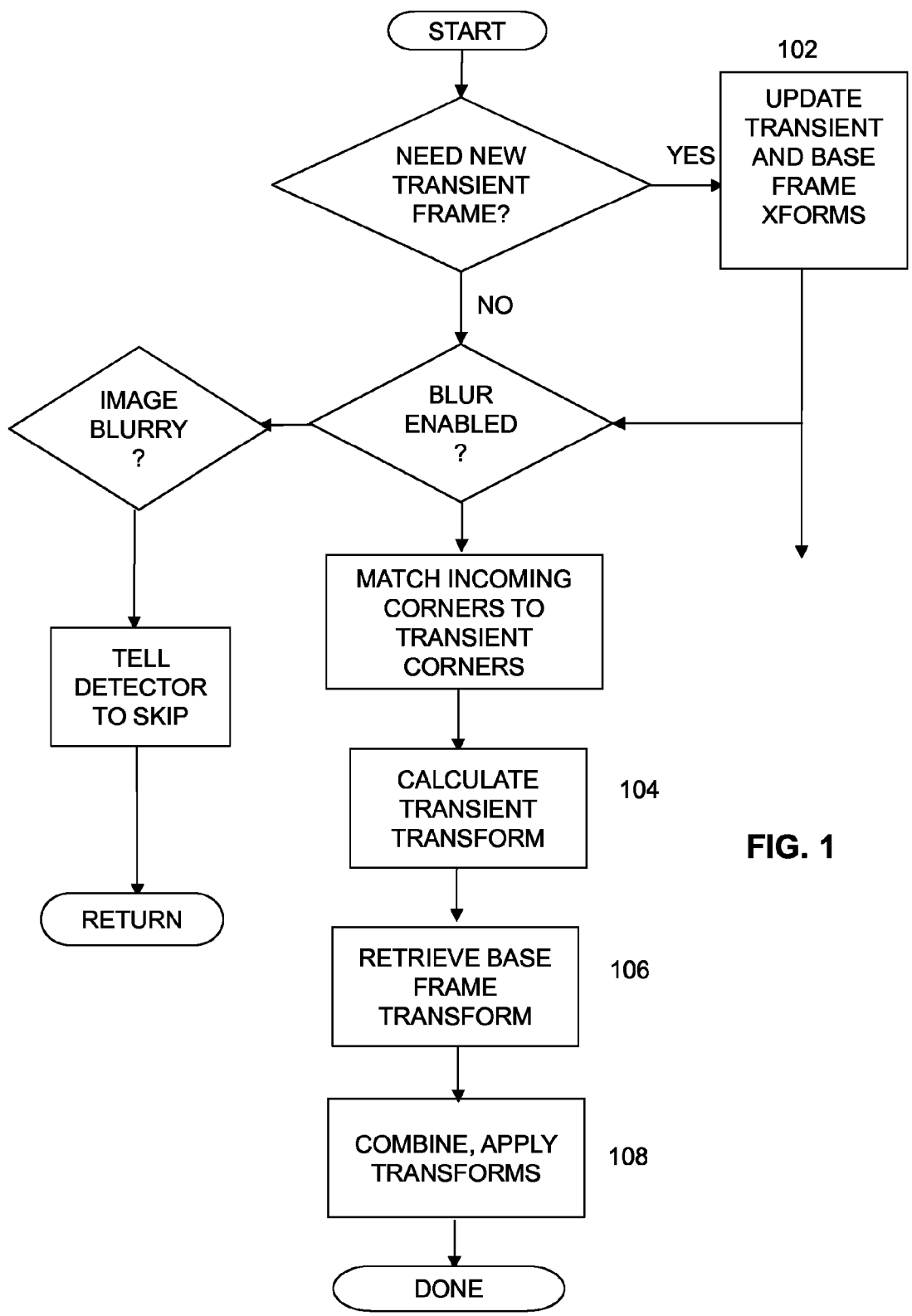
FIG. 1 is a flow diagram that illustrates steps in accordance with an aspect of the present invention.

Aspects of the present invention extend the capabilities of typical image stabilization methods in video surveillance systems by providing compensation for changes in pole position and orientation caused by longer-term effects which are captured herein by the term "pole drift". Pole drift may reach an image shift of between 10-30 pixels in an image over the course of a day as one indication of pole drift. The effects may be smaller than 30 pixels or greater than 20 pixels. Pole drift is relatively slow and takes place over a longer period of time compared to pole shake. This compensation for pole drift can be done in conjunction with image stabilization compensation calculations for higher-frequency effects which are captured herein by the term "pole shaking" Pole shaking is a much faster effect which may range from 0.1-10 Hz in frequency. A pole shaking amplitude may reach 15-20 pixels, but may be smaller. The amplitude may also be larger. This compensation for pole shaking is done in each frame of incoming video in a pre-processing step, and the resulting stabilized video is sent "downstream" for further video analytics processing.

One aspect of the present invention is the idea of the "base frame coordinate system", which is the coordinate system against which the camera is initially calibrated and oriented in the three-dimensional world. Associated with the base frame coordinate system is a "base frame image", which is the camera view corresponding to this coordinate system. It is most often a snapshot taken from the camera's video stream at the time of camera calibration and system setup. Camera video that is aligned to the base frame coordinate system will perform correct geospatial location of objects.

Aspects of the present invention provide an extra stabilization step after a first-stage method compensates the incoming video stream for higher-frequency effects such as pole shaking. The first stage method compensates for high-frequency effects by establishing a "transient coordinate system" relative to an arbitrary frame (called the "transient image") in the incoming video stream, and then subsequently transforming each incoming frame back into that transient coordinate system. This transient coordinate system is updated periodically (typically on the order of every few minutes) and tracks changes in the imagery caused by varying levels of illumination and other short-term phenomena. This transient coordinate system may differ from the coordinate system against which the camera was initially calibrated.

The extra stabilization step mentioned above occurs after the incoming frame has been transformed back into the transient coordinate system and serves to transform that transformed image, which is aligned in the transient coordinate system, back into the base frame coordinate system. After this extra transformation is complete, each pixel in the resulting video stream is oriented properly in the three-dimensional world. Thus, objects detected and processed in the image plane will be accurately located in the three-dimensional world.

Aspects of the present invention makes it possible for fixed objects in a scene to in the same pixel location over the course of a day, even if the motion of the camera at a pole top would have caused the object to apparently move by many pixels over the course of a day, as thermal and other effects changed the location and orientation of the cameras mounted on the pole or other holding structure.

In one embodiment of the present invention the herein provided stabilization methods apply to movement of the camera that fall within the field-of-vision of the camera.

FIG. 1 is a flowchart that illustrates steps of an image stabilization method and its extensions for pole drift compensation in accordance with an aspect of the present invention. This method is performed on each frame of the incoming video stream.

All incoming frames are first stabilized back to a transient coordinate system that is established periodically by selecting a frame from the incoming video stream. The transient coordinate system is updated every few minutes and tracks fairly rapid changes in imagery (e.g., changes in illumination at dawn and dusk.) Whenever a new transient coordinate system is established, the method attempts to calculate a transformation from the transient coordinate system to the base frame coordinate system.

Subsequently, each incoming frame will have two logical transformations applied to it: a per-frame transformation 104 that maps each frame back to this transient coordinate system, and then a fixed (for the lifetime of the transient coordinate system) transformation 106 that maps the resulting frame back to the coordinate system against which the camera was initially calibrated. Note that while logically this is a two-step process, in practice the transformations are represented as matrices and the matrices are calculated and combined in a single transformation 108 before the incoming image is transformed at all. The net result is that only one physical transformation has to be applied to the incoming image. This limits processing requirements.

The actual calculation to determine the amount of pole drift compensation needed is thus only performed when a new transient coordinate system is established in step 102.

An optional feature of the method is to "pull" the image towards the final pole drift compensation slowly over time, to minimize the possibility of sudden "jerks" in the video if for some reason a large change in pole drift compensation is calculated.

Figure 2:
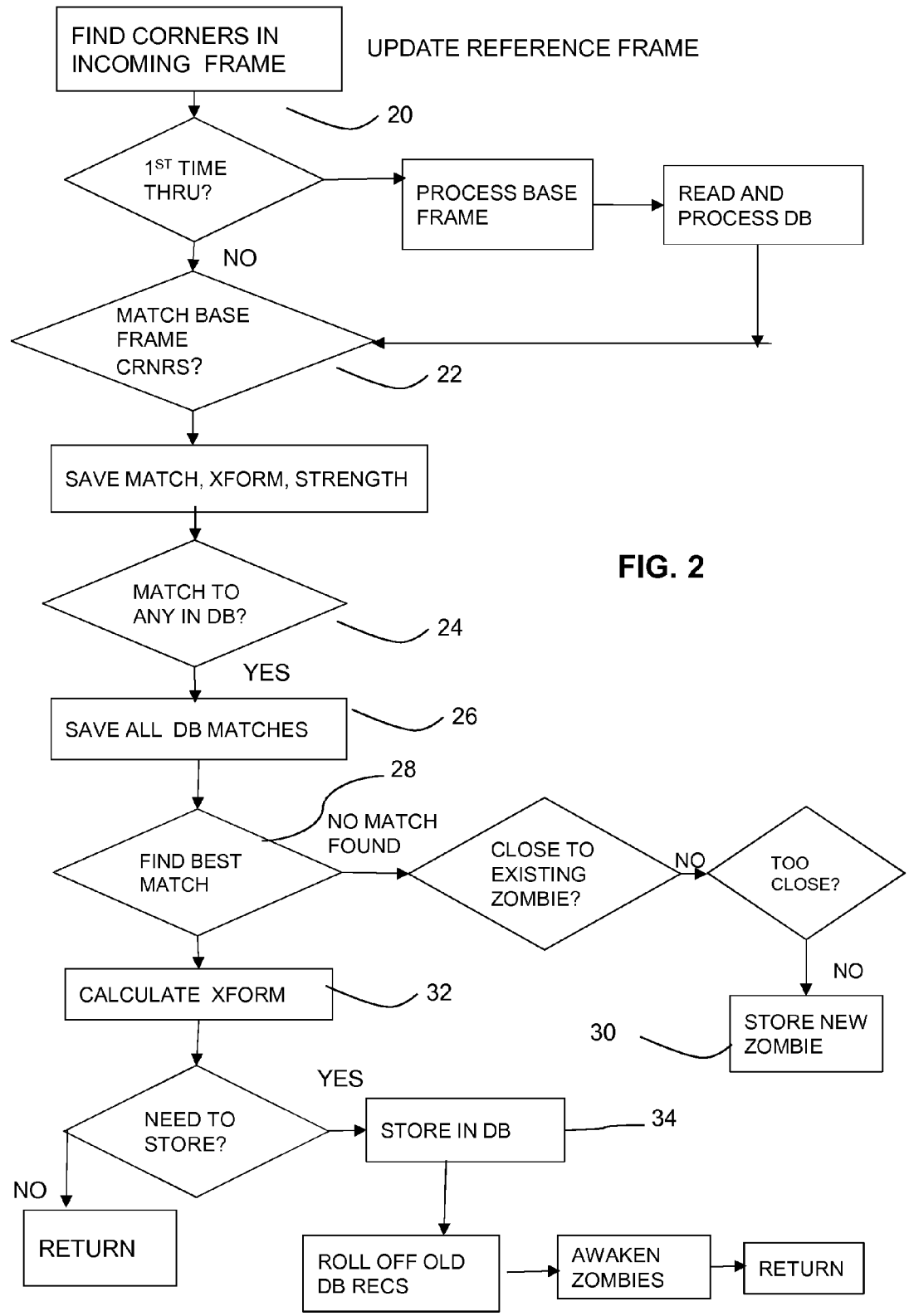
FIG. 2 is a flow diagram that illustrates steps in accordance with an aspect of the present invention.

FIG. 2 is a flowchart which details steps required to calculate a new pole drift compensation transform. These calculations are executed whenever a new transient coordinate system is established. First, Harris corner detection is performed 20 on the new incoming image associated with the transient coordinate system. This new incoming image will become the basis of the new transient coordinate system. The method will attempt to find the location of these corners in each subsequent incoming frame; this captures the compensation for pole shaking and other high frequency movement. While Harris corner detection is used herein, the methods provided herein are not limited to this feature detection method. Other feature detection methods can also be applied.

The method next performs pole drift calculations. First, upon startup, the method reads the image associated with the base frame coordinate system (this is called the "base frame file"). The method also maintains a database of paired transform and image that provide "intermediate" images and transforms that can themselves be directly mapped back to the base frame coordinate system. An incoming image that can be matched to an intermediate image can thus be matched back to the base frame coordinate system in two logical steps, going through the selected intermediate image/transform pair.

In step 22 corners in an incoming frame are checked against corners in a base frame. With respect to pole drift, there are thus two possibilities for each new transient image and associated transient coordinate system:

(1) If the transient image can be directly mapped back to the base frame coordinate system (that is, a proper correspondence between corners in the two images can be established), then the transient image-to-base frame coordinate system can be directly established; or, (2) If the transient image can be directly mapped back to an intermediate image/transform pair in the database, which in turn can be directly mapped back to the base frame coordinate image, then the two transformations can be combined to provide a direct mapping from the transient image to the base frame coordinate image. "Directly mapped back" means that a strong correlation, sufficient to define a mathematical transformation between the two images, exists between corners in the respective images.

Between the existing base frame image and the database of intermediate images, any incoming new transient image and coordinate system may match multiple images. In step 24 it is checked if there is a match between the already stored results in the database.

The "best" (i.e., strongest correlation between corners) fit is selected in step 28 and used in the calculation in step 32 of the new transient-to-base frame coordinate system. In either case above, the correlation may be strong enough to create a mapping, but sufficiently weak so that the resulting image/transform pair is itself stored in the database in a step 30, and used as a potential match candidate for future transient images. If no match can be established in a step 28, then by definition it is impossible to map the incoming image back to the base frame coordinate system. Thus, no pole drift compensation can be applied. However, this failed-to-match image is "saved" so that later on, the method may match this image to a new incoming transient image that can in turn be mapped back to the base frame image. If this later match between the current, unmatchable image and a later, matchable image/transform pair can in fact be performed, then: (a) a transformation will be calculated, and (b) this current image will be saved in an image/transform database.

An unmatched image that is saved, in hopes of being matched later, is called a "zombie". Unmatched image in this context means that no transformation can be established that transforms the image to a transient image or a base image. Zombies are saved in a table, for instance in step 30 in FIG. 2, which can be a two-dimensional table, where each column contains zombies that are related to each other by a calculated transform. When an incoming new image matches the head of the column, transformations back to the base frame coordinate system can be calculated for each zombie in the column.

When a new transformation is stored in the database in step 34, the list of zombies is scanned. If any zombies can be matched back to the new transformation, they are removed from the zombie list, converted to valid intermediate image/transform pairs, and stored in the database.

Further Details

The following section will explain the above methods that are provided in accordance with various aspects of the present invention in further detail. Several concepts underlie the pole drift compensation method which is provided as an aspect of the present invention.

1. The drift is over very long periods of times: long enough that the imagery can change significantly between the base reference frame (also called the base frame) and the current periodically-changing stabilized reference frame (also called the "transient frame" or "transient reference frame");

2. A multitude of mapped frames and associated information is maintained—that is, a set of frames to which the base frame has previously been matched and mapped, and to which attempted matches can be made to newly established transient reference frames. These are also called "bridge frames" because they can act as a 'bridge' between an incoming frame and the base frame;

3. The notion of the slowly varying camera orientation ("pole drift") is decoupled from the rapid motion jitter ("pole shake"), and separate transformations are calculated for each;

4. Up to three transformations may be combined together for any one input frame: one transformation from the incoming frame to the transient frame, one from the transient frame to one of the multitude of mapped frames referenced in #2, and a transformation from that mapped frame back to the base frame;

5. These separate transformations are combined together at the end, via matrix multiplication, so that only one full-blown image transformation computation is performed for each frame; and 6. The transformations are parameterized image-based transformations, not actual camera motion parameters like tilt, pan, or zoom.

Image Stabilization creates and manipulates affine transformations, and subsets of affine transformations, in three different coordinate systems:

(a) The coordinate system of the incoming image;

(b) The coordinate system of the 'transient reference' frame, which is used as the coordinate system against which short-term shaking and pole vibrations are referenced; and (c) The coordinate system of the 'base frame', which is the 'true' reference frame after all shake and long-term drift phenomena have been eliminated. The base frame is represented as for instance a .bmp file.

The affine transformations map images in one coordinate system to a corresponding image in another coordinate system.

The system is configured at installation time such that the world coordinate (X, Y, Z) (in some world coordinate system) of each pixel location (u, v) in the base frame is calculated, stored, and assumed correct. This can be done at system installation with a configuration tool. The configuration tool creates a table of pixel coordinates to world coordinate relationships at the time of installation. It operates in conjunction with a "model of the physical world" that is prepared for each site. An arbitrary fixed world point with coordinates (X, Y, Z) will have image-space coordinates (u, v) in each of the above coordinate systems. If conditions are "perfect"—no pole shake or drift, perfect correspondence between the base frame and the incoming image, etc.—the three sets of (u, v) coordinates should in principle be identical. However, pole shake and pole drift effects often result in (u, v) coordinates that vary across all three coordinate systems, for the same point in the physical world.

One purpose of a compensation method provided in accordance with an aspect of the present invention is to create a combined transformation that transforms the coordinate system of an incoming image into the coordinate system of the base frame. Once transformed properly, images in the incoming image will display at their proper locations in the base frame (image space) and in the system's display of the world (world space).

A Stabilization Method

Stabilization contains four steps or processes.

(1) The method periodically selects a transient reference frame from the stream of incoming images. The method attempts to select reference frames that are unbiased with respect to the current stream of applied image corrections (i.e., it tries to select a transient frame that lies at the "center" or "mean" of the jitter). It may not be possible to select a transient reference frame, in which case the stabilization method resets to a known starting state and tries again with the next frame. If there are too many failures in a short period of time, the method disables itself for several minutes under the assumption that current conditions are too ill-defined for well-behaved stabilization;

(2) Whenever a new transient frame is established, an attempt is made to establish a mapping or transformation between this transient reference frame and the base frame. This mapping may be direct, or may use an "intermediate transformation" to get back to the coordinate system of the base frame. This final transformation is represented as a 3×3 matrix, called C, and implemented as a 3×3 homogenous matrix. It may be a product of two component matrix transformations, if an intermediate transformation is used. It is not always possible to establish this mapping;

(3) For each incoming frame, a unique per-frame transformation is determined that maps the incoming image to the transient reference frame. This transformation is represented as a 3×3 homogenous matrix W; and (4) For each incoming frame, a composite transformation $T_{3 \times 3} = C_{3 \times 3} \times W_{3 \times 3}$ is calculated. This transformation maps the coordinate system of the incoming frame to the coordinate system of the base frame. It is applied to the incoming image to produce a new, transformed image which is sent on to the rest of the analytics pipeline.

'C' and 'W' derive from some alternative terminology. 'C' represents the 'cold' or transient-to-base frame transformation, and 'W' represents the 'warm' or incoming image-to-transient transformation. The 'W' transform changes every frame, hence 'warm'; the 'C' transform changes at a much slower rate, representing the pole drift from the current ("warm") pole state to the original ("cold") state.

(1) Selection of a Transient Reference Frame

The method begins with no transient reference frame. Initial incoming frames are evaluated as candidate reference frames. After the initial selection of a transient frame, incoming frames are periodically evaluated and may become the new transient reference frame.

An incoming reference frame becomes a transient reference frame when enough sufficiently strong corners can be found in the image, using for instance the Harris corner detection method. "Enough" and "sufficiently strong" are tunable parameters. "Enough" is defined in terms of number of corners found. "Sufficiently strong" is defined in terms of the minimum eigenvalue of the second-moment matrix at each corner. The method provided in accordance with an aspect of the present invention also has provisions to ensure that corners are not clumped too closely together. Corner finding in the pole drift portion of the method adds logic to try to force the selected corners to be dispersed evenly over the entire image, rather than just clustered in certain parts of the image.

(2) Mapping Between the Transient Reference Frame and the Base Frame

This part of the method is an aspect of pole drift compensation. The method will attempt to compensate for long-term pole drift if:

i) pole drift compensation is enabled and ii) if it is possible to establish a mapping between this new transient reference frame and the base frame. If one or more of these conditions is not met, pole drift compensation is disabled.

Every time a new transient reference frame is established, an attempt is made to calculate a transformation matrix C3×3. There are actually six significant numbers in all of the affine transforms and thus can be represented as a 2×3 matrix and for computational simplification math libraries using 2×3 matrices can be used, but from a "theory" point of view of the equations used, everything is really a 3×3 matrix. 3×3 also allows for perspective transformations. The bottom row of the matrix is '0 0 1.' The matrix maps the coordinate system of the transient frame into the coordinate system of the base frame. Since matrix W (from a previous step) can be used to map the incoming frame to the transient frame, it follows that once C is calculated, C and W can be composed or combined together as a single transformation to achieve an transformation that transforms an incoming image coordinate system->base frame coordinate system by combining: incoming image coordinate system->transient coordinate system->base frame coordinate system.

In addition to the one base frame that is the ultimate reference frame for the true coordinate system, the running system maintains a database of persistent intermediate transformations $I_1, I_2, I_3, \ldots I_n$, where n is an operating parameter representing the size of the database. Each bridge image is directly transformable back into the coordinate system of the base frame via the associated transformation. A given bridge transformation may act as a "bridge" between an incoming transient reference frame and the base frame. Each record in this database contains:

(a) An image (for instance in .jpg format), corresponding to the exact scene when this record was created;

(b) The corresponding transformation $I_{2 \times 3}$ that transforms the coordinate system of this intermediate image back to the coordinate system of the base frame; and (c) The last time this transformation was applied.

At runtime, both the base frame and each record in this database calculate and store a list of their own corners. These corner lists are not persisted into the database.

When a new transient frame is established, the method takes the lists of corners from both the base frame and the database frames and attempts to find the corresponding corners in the new transient frame. The best of all successful matches is used in subsequent steps. If no successful match can be found, no pole drift compensation is performed.

For a successful match between the new transient frame and any of the base frame or database files, two tests must be passed. First, for each N×N patch around each corner in the base frame or database image (where N is a small tunable odd integer), all corresponding N×N patches within a larger M×M neighborhood in the transient frame are searched. A normalized correlation coefficient is calculated for each of these N×N patches. The patch with the highest normalized correlation coefficient is the best match to the corner in the base frame or database frame. The match is considered successful if this normalized correlation value is higher than an operating threshold. To pass the first test, the percentage of all corners successfully matched against the threshold must exceed another operating threshold. To pass the second test, a "valid" affine transformation matrix as defined below must then be found.

The affine transformation is found as follows. The two-dimensional affine transformation matrix I is considered, wherein $$I = \begin{vmatrix} a00 & a01 & a02 \\ a10 & a11 & a12 \\ 0 & 0 & 1 \end{vmatrix}$$

If $a00=a11=1$, and $a10=a01=0$, then the transformation is called a translation transform. If $a00=a11$ and $a01=-a10$, the matrix represents a similarity transform. Both are subsets of an affine transformation. Each can be calculated by the method that is provided as an aspect of the present invention.

To calculate this matrix, the following overconstrained least-squares problem is solved via QR decomposition and back substitution:
$A_{2n\times 6} I_{6\times 1} = B_{2n\times 1}$, wherein $$A = \begin{vmatrix} x1i & y1i & 1 & 0 & 0 & 0 \\ 0 & 0 & 0 & x1i & y1i & y1i \\ x2i & y2i & 1 & 0 & 0 & 1 \\ 0 & 0 & 0 & x2i & y2i & 1 \end{vmatrix} \quad I = \begin{vmatrix} a00 \\ a01 \\ a02 \\ a10 \\ a11 \\ a12 \end{vmatrix} \text{ and } B = \begin{vmatrix} x1r \\ y1r \\ x2r \\ y2r \end{vmatrix}$$

A is the matrix of transient corners stacked on top of each other. B is the vector of base frame or transient corners stacked on top of each other. This overconstrained system of linear equations is solved using an iterative robust least squares approach. The I vector is the vector of transformation coefficients, which needs to be determined.

Robust least squares works as follows. For each corner, it is attempted to find a "best" transformation that accurately predicts the actual location of each corresponding corner in the reference frame. The actual location for corner 'n' is $(x_{nr}, y_{nr})$. The predicted location is $(a00*x_{ni}+a01*y_{ni}+a02, a10*x_{ni}+a_{11}*y_{ni}+a20)$. The Euclidean distance between these two points is a measure of how accurately the model has predicted the location of that corner. In robust least squares, pairs of corners are discarded if the Euclidean distance between them exceeds an operating threshold and the model is rerun. This process proceeds iteratively until no points are discarded from the model.

The resulting affine transform matrix is considered "valid" if
i) it exists,
ii) the number of points included in the model after all robust least squares iterations exceeds an operating threshold,
iii) a number of robust least squares iterations does not exceed an operating threshold, and
iv) the resulting transformation does not move any pixel more than an operating threshold number of pixels.

The "best" of all successful matches is defined to be the match that has the highest percentage of successfully matched corners. It is also at this point that image/transformation pairs may be entered into the database. The following cases are possible.

(a) If the best of all successful matches is the base frame, then the matrix I is in fact the matrix C and represents the transient coordinate system-to-base frame coordinate system transformation.

(b) If the best of all successful matches is an image/transform pair taken from the database, then the matrix I can be combined with the transform Q in the database to compute $C=Q*I$. The 'last updated time' of the chosen database record is updated.

(c) If there are no successful matches, pole drift compensation is disabled until successful matches can be executed against a subsequent new transient reference frame.

(d) If a successful transformation, or series of transformations, back to the base frame coordinate system has been found, then it is possible that the database of intermediate transformations may need to be updated. Once a transformation from transient to base frame has been determined, the method rates that transformation as a 'strong match', 'average match', or 'weak match', based on the overall strength of the match between corners in the transient frame and the corresponding corners in the base or database frame. If the frames do not strongly match, then the incoming new transient frame is stored in the database, along with its transformation to the base frame (six numbers) and the current time. The idea is that a later transient frame may have 'drifted' far enough away (in a visual appearance sense) from the base reference frame so that it cannot be matched to that frame, but may be able to be matched to this newly-stored frame. The corners of this newly stored frame are also calculated to facilitate subsequent matching to new transient reference frames. If the database size exceeds an operating threshold, then the least-recently-used transform/image/timestamp record is deleted from the database. As a last step in this process, it is checked if any 'zombies' (defined below) can be awakened. If any zombies can be 'awakened', they are placed in the database.

A 'zombie' is an incoming transient reference frame and associated transform that cannot be matched to any intermediate database frame, or to the base frame itself. If the zombie matrix is not full (another tunable parameter), it is placed somewhere in a two-dimensional array of zombies. The first row of the zombie matrix contains transient images that cannot be matched to any other zombie images in the matrix. If a subsequent candidate-zombie transient frame is visually "close but not too close" to an existing zombie, it is added onto the matching zombie's column, along with the transform that maps it back to the coordinate system of the zombie in row 0 (the head of the column) If it is "too close" to an existing zombie, it is not entered into the matrix. If it is "far away" from any other zombie, a new column in the matrix is created, with this zombie at its head.

The idea here is that images that are different from the base frame or intermediate database images are stored in the array of zombies (unless they look too much like an existing zombie) along with a transform that takes them back to the zombie at the head of the column. A dummy identity transform is associated with the zombie in row 0; it cannot yet be matched back to the base frame, or to an intermediate transform.

If the head of a particular column of zombies can subsequently be matched to an incoming transient frame and a valid transform T from zombie coordinates to transient coordinates established, then that transform T can be combined with the transform Q that maps the incoming transient frame to the base frame to produce a combined transform $I=Q*T$. Similarly, each zombie in that column has an associated transform Z, and the combined transform I=Z*Q*T will map that particular zombie back to the base frame. In this case, the zombies are "awoken", placed into the database, and deleted from the zombie matrix.

(3) Incoming Image->Transient Reference Frame

A second affine transformation matrix W is now considered, where $$W = \begin{vmatrix} a00 & a01 & a02 \\ a10 & a11 & a12 \\ 0 & 0 & 1 \end{vmatrix}$$

If a00=a11=1, and a10=a01=0, then the transformation is called a translation transform. If a00=a11 and a01=−a10, the matrix represents a similarity transform. Both are subsets of an affine transformation. Each can be calculated by the method.

To calculate this matrix, the following overconstrained least-squares problem is solved via back image corresponding to the corner $(x_{r1}, y_{r1})$ in the warm reference frame. $A_{2n \times 6} W_{6 \times 1} = B_{2n \times 1}$ where $$A = \begin{vmatrix} x1i & y1i & 1 & 0 & 0 & 0 \\ 0 & 0 & 0 & x1i & y1i & 1 \\ x2i & y2i & 1 & 0 & 0 & 1 \\ 0 & 0 & 0 & x2i & y2i & 1 \end{vmatrix} \quad W = \begin{vmatrix} a00 \\ a01 \\ a02 \\ a10 \\ a11 \\ a12 \end{vmatrix} \text{ and } B = \begin{vmatrix} x1r \\ y1r \\ x2r \\ y2r \end{vmatrix}$$

In the matrices A and B, all of the corners are "stacked" on top of each other and the overconstrained system of linear equations is solved using an iterative robust least squares approach. Points whose (actual—predicted) values fall outside of a programmable threshold are discarded and the model is re-run until no points fall outside of the (actual—predicted) threshold.

The matrix W has now been calculated and maps the incoming frame into the coordinate system of the transient reference frame. This is sufficient to correct high-frequency shake. A second step is applied to compensate for long-term pole drift.

(4) Composite Transformation

Given a transform W from incoming frame to transient frame, and a transform C from transient frame to base frame, the combined transform T=W*C will map the incoming frame to the base frame. Note that:
(a) W is calculated once-per-frame, and C is calculated once-per-transient frame;
(b) Calculation of C potentially involves many sub-transformations, involving intermediate database records and also zombie calculations, which may themselves involve two-step transformations;
(c) The calculation cost of C>> the calculation cost of W, but C is calculated much less frequently than W;
(d) The matrices all are combined where appropriate, so at the end, only the final combined transformation is applied to the image. The actual application of the combined transform to the image is relatively expensive; combining the transforms and applying the combined transform once, as opposed to applying the individual transforms separately, is much more efficient from a computational point of view.

Detailed Functional Description

The methods as provided herein in accordance with various aspects of the present invention are next described as an illustrative implementation on a processor. Processors are of course known. Common functional steps of for instance image processing can be implemented by applying for instance Intel®'s Integrated Performance Primitives (Intel® IPP). Details on these functional processor implementations are widely available on-line. For instance at <URLhttp:// software.intel.com/en-us/articles/intel-integrated-performance-primitives-documentation/>. It is noted that methods as provided herein in accordance with various aspects of the present invention are believed to be novel. Even though they can be enabled on a processor by at least partially using basic functional image processing steps, the methods themselves are not available as part of Intel® IPP and require the steps as disclosed and described herein.

Other implementation than the following description are possible and are fully contemplated.

Image Stabilization

The stabilization method may include at least two parts: a detection part (for instance a corner detection method and an optical flow method. Optical flow was the first method implemented and works well under ideal conditions but is very sensitive to camera noise, photometric variation, and other forms of image perturbations. It remains implemented in the method and can be used as a reference point if the corner detection method has problems, but the corner detection method is envisioned to be a preferred image stabilization method.

Overview and Mathematical Preliminaries

The Corner method stabilizes the current frame by aligning the corners in the current frame to the corresponding corners in the reference frame.

A "corner" is a point—a single pixel—with sharp intensity changes in two perpendicular directions. Note that the direction of changes does not need to be parallel to the x- and axes as is illustrated in FIG. 3.

Figure 3:
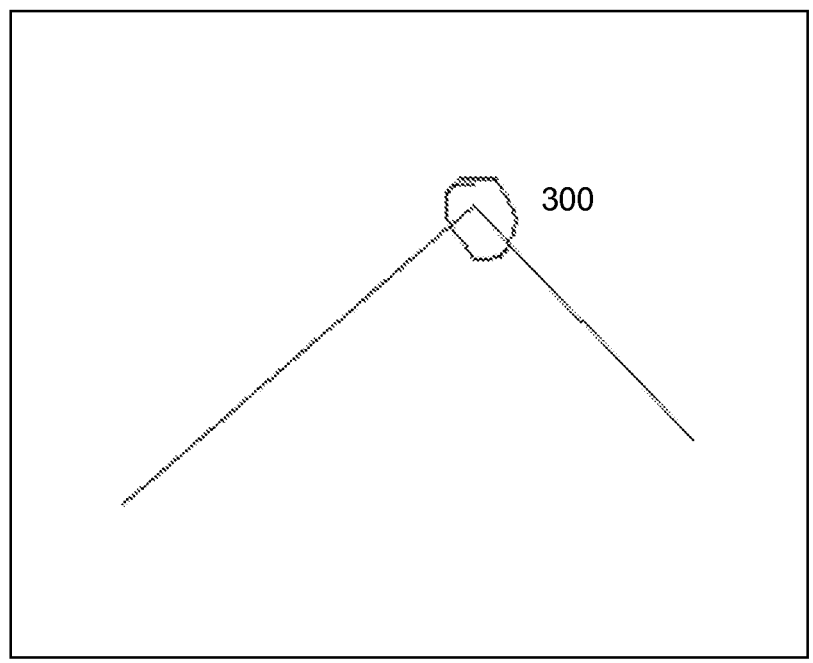
FIG. 3 illustrates a corner as a detectable feature in an image.

In the example as illustrated in FIG. 3, the "strength" of the one corner circled 300 runs along lines or "principal axes" that are oriented at a 45-degree angle (more or less) from the native x- and y-axes of the frame.

Corners are first detected on the reference frame. Corners have an (x, y) location in the reference frame. Small image chips from the corners are saved as templates to be used in template matching with the following frames.

In the following frames, "template matching" is conducted for each reference corner in predicted region in the current frame. If a match is found, the matching pair is saved.

The saved matching pairs of (x, y) coordinates—one set of (x, y) coordinates corresponds to the corners in the reference frame, and the other set of (x, y) coordinates corresponds to the corresponding corner in the incoming frame—will be used to calculate the transform parameters using the method of robust least squares. These transform parameters are used to transform the incoming, unstabilized frame into the outgoing, stabilized frame.

Here's a simplified numerical example of the mechanics of this process. Suppose one has two corners in a reference frame, one located at (10, 10) and one located at (20, 25). Suppose the corresponding corners in the incoming frame are found to be located at (11, 12) and (21, 27). The transform that is searched for is the "best" transform that maps the incoming frame back to the reference frame. In this case the transform we are searching for is:

$x' = x - 1$ $y' = y - 2$

This means that the gray scale value at each pixel (x, y) in the incoming frame needs to be displayed at location (x', y') in the outgoing frame. For example, (21, 27) in the incoming frame—the sharp corner—needs to be displayed at (20, 25) in the outgoing stabilized frame. Similarly, (152,193) in the incoming frame needs to be displayed at (151, 191) in the outgoing, stabilized frame.

The set of equations (x'=x−1, y'=y−2) is called a transform. This transform is applied to the incoming image and produces an outgoing, stabilized image. The numbers −1 and −2 are called transform parameters; they're the numbers that, for this frame, one is trying to determine. For each incoming frame that needs to be stabilized, the stabilization method calculates the transform parameters for the "best" possible transform of the specified type that can be applied to that frame.

The method of robust least squares is used to calculate the transform parameters. Robust least squares comes up with coefficients for an equation that relates each (x, y) coordinate to each (x', y') coordinate. The equation is "best" in a least-squares sense—that is, it minimizes the sum of the squared errors between the predicted (x', y') coordinate and the actual (x', y'). There are four different kinds of equations, each with its own set of coefficients, and the method calculates the coefficients for the desired kind of equation. (The four types of equations, described below, are translation, similarity, affine, and perspective; the 'ModelType' parameter controls which model is used by the method.)

The transform above can be represented as a 2×3 matrix:
[0 0 −1]
[0 0 2]
Using matrix algebra one can represent this transform as:
[0 0 −1] [x]=[x']
[0 0 2] [y]=[y']

This matrix multiplication relates each (x, y) pixel value in the incoming image to a transformed (x', y') location in the outgoing, stabilized frame. The above matrix is called the transformation matrix. For each frame, one comes up with a transformation matrix to apply to the incoming unstabilized frame, to produce an outgoing stabilized frame.

Note that this example is simplified, and that fractional math may come into play. For example, the incoming pixel value at incoming location (86, 22) may wind up needing to be placed at (84.3, 20.6) in the outgoing frame. There is no (84.3, 20.6) location in the outgoing frame, of course—there are just integral pixel locations. The process of converting these fractional locations into a "smooth" outgoing image with the right values at each integer-valued pixel location is called interpolation. There are different types of interpolation (which can be defined in a registry setting.) In general, more complex interpolation methods produce "better" (smoother) results, at the cost of increased computing time. Image stabilization defaults to 'linear interpolation' ('L') and should be sufficient for most cases.

The general form of the simple transform we demonstrated above is as follows:

$$x'=x+a$$

$$y'=y+b$$

where a and b are real numbers. This type of transform is called a translation transform and accommodates up-and-down and left-and-right (which can be combined to produce diagonal motion) camera motion. In a translation transform, 'a' and 'b' are the transform parameters, and are what the method "solves for". Because there are two unknowns, this model is said to have "two degrees of freedom".

A more complicated transform is $$x'=ax+by+c$$

$$y'=-bx+ay+d$$

where a, b, c, and d are real numbers. This type of transform is called a similarity transform and accommodates translation, plus rotation and scaling (image gets larger or smaller). This model has four degrees of freedom and the a, b, c, and d coefficients are what the method solves for.

A yet more general transform is:

$$x'=ax+by+c$$

$$y'=dx+ey+f$$

where a, b, c, d, e, and f are real numbers. This type of transform is called an affine transform and accommodates everything that a similarity transform does, plus shearing. Shearing generally does not model real-world shaking effects and can introduce undesired visual artifacts into the outgoing image. This model has six degrees of freedom.

A yet more general transform, discussed below, is a perspective transform. It theoretically better accommodates the idea of "distance" in an image—for example, the idea of railroad tracks that go off into the distance converge to a single point in a two-dimensional image. A perspective transform has nine degrees of freedom.

The process of applying this calculated transform to the image is also called warping the frame.

The basic idea is very straightforward but needs quite elaborate procedures and supporting modules to make it work with the real-life scenarios. In particular, ensuring that the reference frame is "best", and resetting image stabilization where necessary, is an important part of the method.

Stabilization Map

The Stabilization map is created from the map creator tool during system setup. It indicates unstable regions, such as sky, water, waving trees and vegetations etc, that are unsuitable for picking solid corners for stabilization. Pixels with numerical values of 100 or 200 in the stabilization map are excluded from stabilization—that is, they are not considered as possible corner point candidates.

The pixels along the borders of stabilization map are also "muted". If a reference corner is too close to the image border, the search region will be squeezed and one might not even have enough space for template matching.

When enabled, the stabilization map might also be combined with the method map. The reason is that if a region is excluded for motion detection on a method map, it is very likely that that region is not suitable for picking corners for stabilization.

The 3 steps above produce a fixed map to be used in every frame.

At each frame, this fixed map will also be combined with the current motion map generated by the detector from the last frame. Motion map is slightly dilated to accommodate blob movements between two consecutive frames.

Relevant registry settings may be implemented related to the stabilization map including Boolean settings; 0/1, path to the stabilization map, determines how much the motion map is "widened" or "extended", larger values exclude more pixels and the like.

Reference Frame

The reference frame is the frame that subsequent frames will be warped back to. It contains dozens of corners (default 50) that serve as the templates to be matched with for the following frames. A template is a small region, typically 5 pixels on a side, around each corner. This small region is matched to all possible 5-pixel-on-a-side regions in the incoming frame, near the corner location; the best match is used as the match for this particular corner.

Under the following conditions, the reference frame will be updated:

(1) After some period of time (default 6000 frames), if a new incoming frame needs only a "negligible" transform, then the current frame will become the new reference frame. This maintains photometric relevancy.

(2) If there is a persistent bias in the reference frame and if the calculated transform for the new incoming frame produces a correction that matches the bias very well, then the current frame will replace the current reference frame.

(3) For certain error conditions, the reference frame will be invalidated, or invalidated and updated. For example, when the stabilizer fails to find enough corners for a reference frame, or to match to the reference frame, or cannot calculate a transform to warp the current frame back to the reference frame, then the stabilizer will reset itself; in this process it will attempt to acquire a new reference frame.

Corner Search

Mathematically speaking, corners are pixels with large gradients along two orthogonal directions. Its definition is illustrated in Chapter 14 of the Intel® IPP image processing document. In short, using the grayscale value within a small neighborhood, a 2 by 2 gradient matrix is constructed to represent the gradient distribution around that pixel. The two eigenvalues from this gradient matrix represent the corner strengths. The two eigenvectors represent the directions of the edges of the corner.

If a matrix has 2 large eigenvalues, it represents a corner. If it has one large eigenvalue and one small eigenvalue, it represents an edge pixel. If both eigenvalues are small, it is a pixel within a smooth surface.

If the smaller eigenvalue exceeds a registry-definable threshold, the corresponding pixel is considered as a corner. This method is called Harris corner detection method.

The IPP corner function will populate an array of 6 elements, which includes 2 eigenvalues and 2 eigenvectors (4 elements), for each pixel in the raw frame. Therefore, the output eigen-image is the same height as but 6 times wider than the incoming frame.

A good corner requires that both eigenvalues exceed a threshold and being a local maximum within a small neighborhood. The second condition is to avoid finding a cluster of corners.

In general there will be a cluster of pixels, whose minimum eigenvalues exceed the corner threshold, around a real corner. One would like to have only one pixel to represent that corner in order to avoid mismatch in template matching. Therefore, the non-maximum pixels within a small neighborhood are ignored.

This is implemented using an IPP max filter. This max filter will assign a pixel with the maximum corner strength (minimum eigenvalue) within its neighborhood. When subtracting the current corner strength image from the image filtered by a maximum filter, those unchanged pixels are local maximums.

In summary, a corner has to pass the following 3 tests to qualify as a reference corner.

(1) Local maximum.

(2) Its corner strength exceeds corner strength threshold.

(3) Located in "on" areas on stabilization mask, which excludes image boundary and combines stabilization map and motion map together.

If there are too many reference corners, the frame rate will be affected; if there are too few reference corners, it might not be adequate to produce good performance. The time per frame has almost a linear relationship with the number of reference corners used. It is almost constant with variable frame sizes.

Only 4 pairs of matching corners are needed to satisfy the requirement of the most advanced warping model (perspective), but in reality, one will need many more to achieve robust performance. By default, 50 corners are used.

Because the same corner strength threshold will generate very different number of corners on difference scenes, even the same scene under different weather conditions, an automatic threshold adjustment mechanism was maintain constant number of corners.

The function between corner strength threshold and the number of corners is obviously nonlinear. However, it is guaranteed to be monotonic. Therefore, a simple linear searching scheme will always converge to the designated number of corners except when multiple corners have identical corner strength. It is highly unlikely. But in case that is possible, it will easily handled by allowing some tolerance on the number of corners it finds.

A square image chip (11 pixels by 11 pixels) with a corner sits in the middle serves as a template. The template is pre-processed during reference frame update to avoid calculating the same values again and again in the following frames.

Relevant registry settings may include: control "strength" of corners found in the reference frame, addition of extra spreading to any corners found in the reference frame, corner size used in the corner calculation method—may be 3 or 5.

Template Matching

IPP has its own template matching function. It is a FFT based method (till 5.1). The FFT based method is very efficient in handling large templates, but not small templates. For corner-based stabilization, the templates are mostly around 10 pixels. Because the IPP function will process templates every time it is called, a significant chunk of works done by IPP is redundant for stabilization. Therefore, an "optimized" version was developed. This optimized version implements normalized cross correlation directly. Since it breaks the template matching process into steps, it allows skipping processing templates at every frame.

Tests show that the optimized method has speed advantage when template size is less than 16 pixels, which is true for most of the scenarios needing stabilization. However, just for the sake of providing more options for the cases not tested so far, the IPP version, which is FFT based, was also put into the code. The switching is done according to the template size set by a user. When it is larger than 16, IPP FFT based function will be used. Otherwise, the optimized version is used.

Warping (Stabilizing) Images

Using the matched corners, a robust least square fit routine is run to find the warping parameters two warp the current image onto the reference image. The warping matrix is a constant 2 by 3 matrix. There are four ways of defining this warping matrix, corresponding to four warping transforms. All four methods neatly fall into the same framework in calculating the transform parameters.

There are four model types called t, s, a, and p which can be defined in a registry setting.

Translation Transform ('t')

$$\begin{bmatrix} 1 & 0 & t_x \\ 0 & 1 & t_y \end{bmatrix}$$

Where $t_x$ and $t_y$ represent the translation in x and y directions respectively.

It models the shakiness of the images as translations in x and y direction only. This corresponds to a camera shaking in a left-to-right and/or up-and-down manner (and includes "diagonal" shaking as well—e.g., when the camera moves to the left and up, relative to the previous frame.)

Similarity Transform ('s')

$$\begin{bmatrix} s \cdot \cos(\alpha) & -s \cdot \sin(\alpha) & t_x \\ s \cdot \sin(\alpha) & s \cdot \cos(\alpha) & t_y \end{bmatrix}$$

Where s is the scaling factor, $\alpha$ is the rotation angle, and $t_x$ and $t_y$ represents the translation in x and y directions respectively.

There are 4 variables in this system. Therefore, it can model more complicated transform. It models the shakiness of the images as rotation, translation and scaling. The scaling corresponds to the variations in the zoom.

When calculating the parameters, it is easier to replace $s \cdot \cos(\alpha)$ and $s \cdot \sin(\alpha)$ with two intermediate variables. s and $\alpha$ can easily be solved when these intermediate variables are solved.

This transform can capture camera rotation, especially camera rotation in the plane parallel to the image plane.

Affine Transform ('a')

$$\begin{bmatrix} a & b & t_x \\ c & d & t_y \end{bmatrix}$$

represents the most complicated transform for a 2 by 3 matrix. It has 6 variables. Beside translation, rotation, scaling, it can also represent shearing etc effect. It is rarely needed to model so many types of variations. But it might produce better results if there are nonlinear effects, such as lens distortion. It also can theoretically model some kinds of perspective effects (i.e., foreground pixels much closer to the lens than background pixels.)

The implementation of the warping transform is taken care of using IPP functions. The only other variable needed is interpolation mode, which governs some final per-pixel calculations for the displayed image.

Perspective Transform ('p')

$$\begin{bmatrix} x' \\ y' \end{bmatrix} = \begin{bmatrix} \frac{c_{11} \cdot x + c_{12} \cdot y + c_{13}}{c_{31} + x + c_{32} \cdot y + c_{33}} \\ \frac{c_{21} \cdot x + c_{22} \cdot y + c_{23}}{c_{31} + x + c_{32} \cdot y + c_{33}} \end{bmatrix}$$

represents perspective transform which is a perfect model mapping a 2D plane onto another 2D plane given a pin-hole camera model. The camera imaging plane is a 2D plane, therefore, if the scene is a large 2D plane, such as airport tarmac, this model may be applied.

[C] is a 3 by 3 matrix with 9 elements. However, because they are homogeneous equations, one can set one element to constant ($c_{33}=1$). Therefore, if there are 4 points, one can solve the perspective transform C. If there are more points, a least square approach should be used.

However, more complicated might not give the best performance. In practice, similarity transform seems having better performance for normal shaky videos.

Here are some guidelines for choosing model type.

(1) 't' is the least expensive and should suffice for "simple" (up-and-down, left-and-right) camera shake conditions;

(2) 's' is the default. This covers translation effects, and adds rotation effects into the mix.

In general, do not use 'a' and 'p' transformations.

Figure 4:
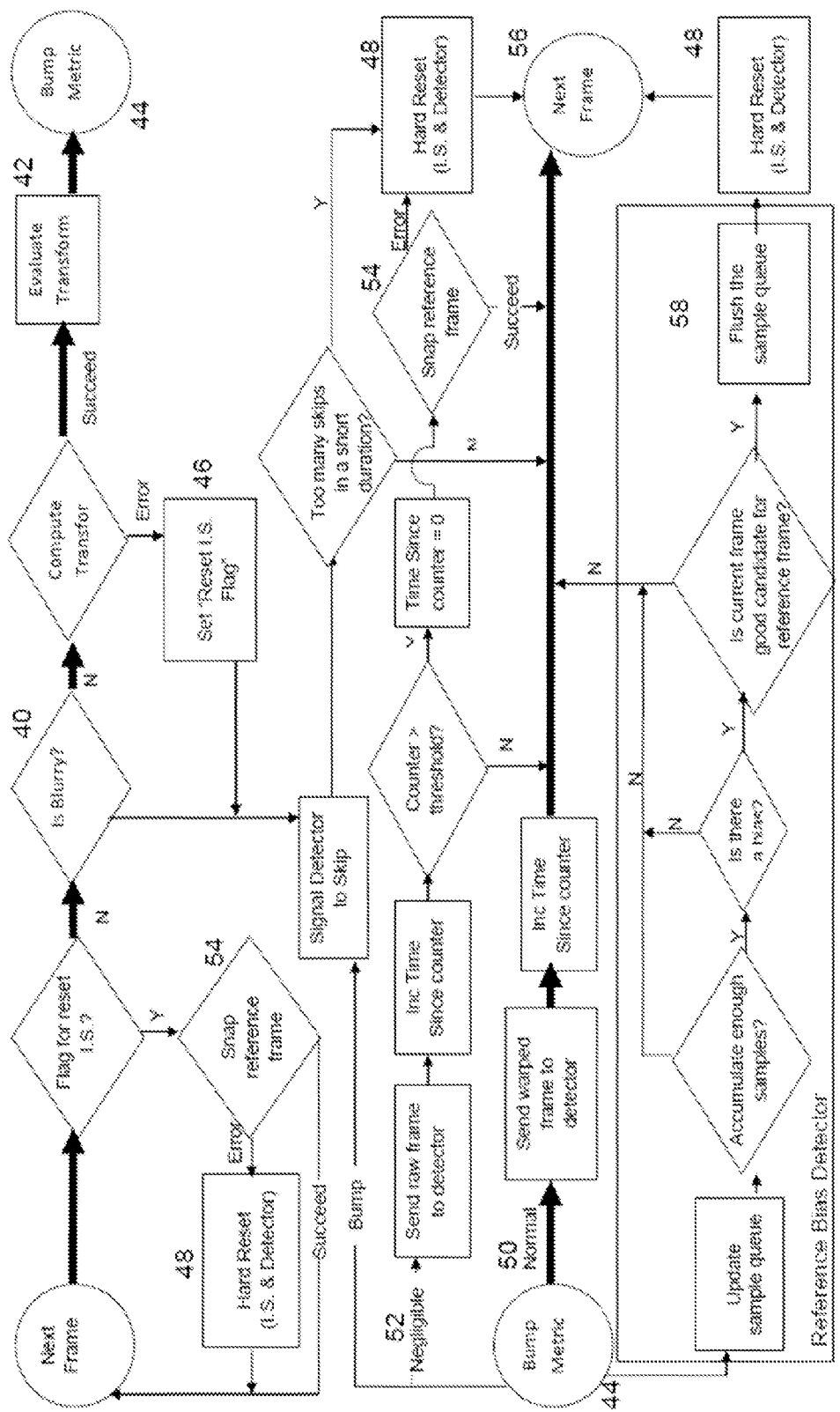
FIGS. 4 and 5 are flow diagrams that illustrate steps in accordance with an aspect of the present invention.

A flow diagram of a corner-based image stabilizer in accordance with an aspect of the present invention is provided in FIG. 4. Herein step 40 is the blurry detection, step 42 evaluates the transform, step 44 reports a bump or excessive deviation. The Image Stabilizer (I.S.) in one embodiment of the present invention and as illustrated in FIG. 4 is provided with control mechanisms that check if the I.S. is working properly. At several stages the Image Stabilizer may be required to perform a hard reset illustrated as a step 48. In a step 46 a flag for a reset after an error in a transform computation is set. Paths 50 and 52 illustrate a flow of image stabilization wherein no initial bump is detected. At step 54 it is checked if a frame is snapped to a reference frame. If no errors are reported the system moves in step 56 to the next frame. The bias reference detector, which will be further described below, is illustrated as block 58.

Detector Feedback

Figure 5:
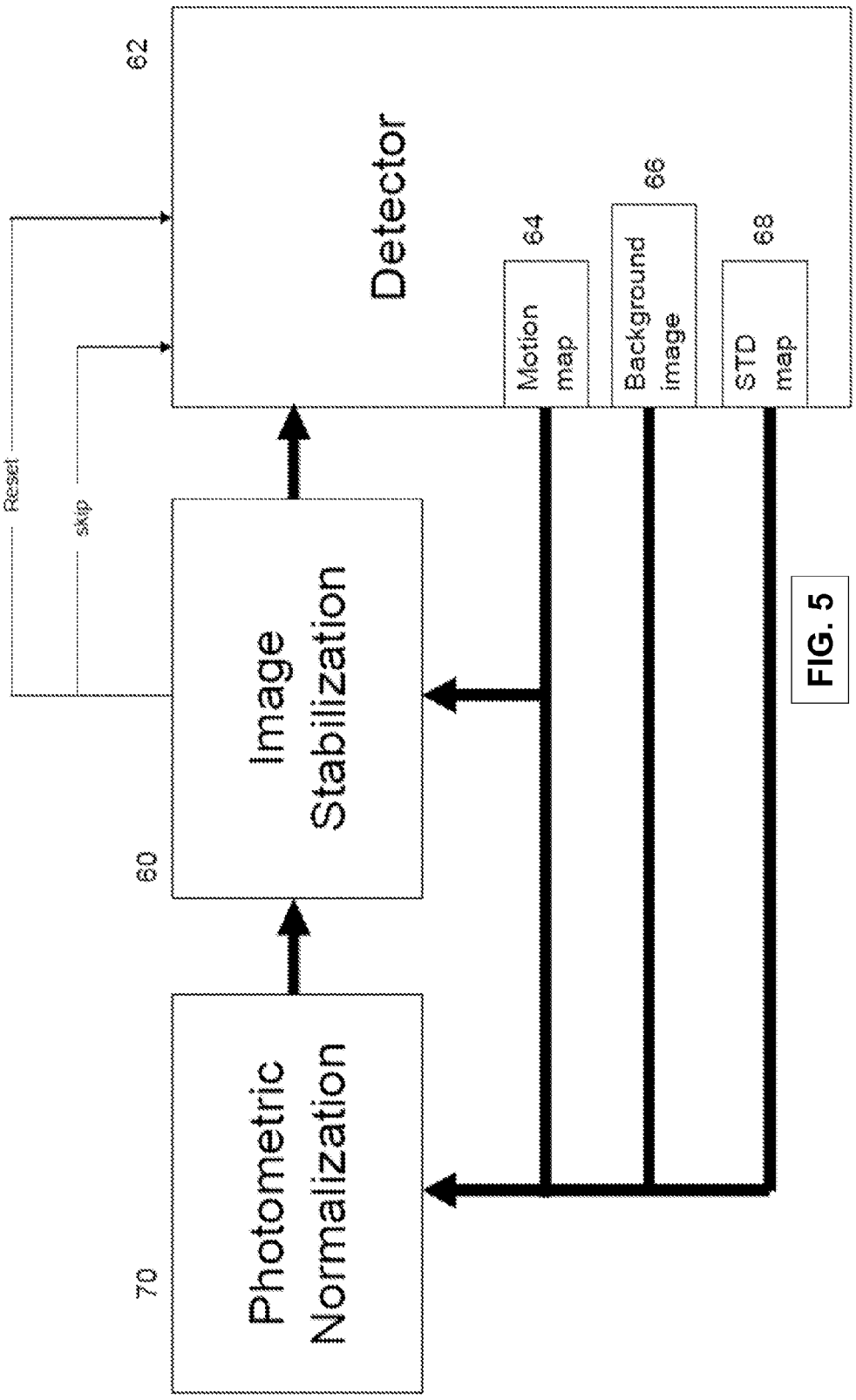

In one embodiment of the present invention, a motion detector is placed after image stabilization in the processing pipeline. But it will feed the background image and the motion map forward into image stabilization to improve the stabilization performance. This is illustrated in a diagram in FIG. 5. The Image Stabilization takes place in 60. The detector 62 provides the motion map 64, the background image 66 and the STD map 68 to a photometric unit 70 which outputs to 60. However, the motion map is also provided directly to 60.

Motion Map

To avoid matching the corners from the reference image onto the moving objects in the incoming frame, it is necessary to exclude the areas with moving objects. Since the motion map is calculated from the last frame, it should be dilated to tolerate the possible changes in the motion map in the current frame.

Blurry Frame Detector

When camera shakes very fast, the images might become blurry. Blurry image will reduce the accuracy in corner locations. It leads to inaccurate and unstable transforms. Because of the dramatic change in appearance, detector should also avoid using blurry frames for motion detection. Therefore, a blurry detector is put in to detect blurry frames and to signal stabilizer and detector to skip the frame. The blurry detection step is identified as step 40 in the flow diagram of FIG. 4.

The blurriness is defined as the mean of the current frame filtered with a high-pass filter. Imaging the same scene, a sharper image will have higher mean value.

Blurring an image is analogous to taking a local average for each pixel in the image. Mathematically speaking, it is equivalent to applying low-pass filtering on an image. The high-frequency information in an image will be reduced or eliminated. Therefore, a high-pass filtering will produce less response on a blurry image than that from a normal image.

Reference Bias Detector (Illustrated as Block 58 in FIG. 4)

It is desirable to use the frame when a camera is at its equilibrium position as reference frame.

(a) It most likely matches the maps and look-up table.

(b) On average, it also only needs transforms with smaller magnitudes to stabilize the current frame.

(c) Border pixels, which might not be updated at each frame due to the camera movements, will be updated more consistently.

However, a stabilizer will generally lock onto the first frame it sees. That frame might or might not be the frame from equilibrium position.

A reference frame has 4 biases, one for each corner of the rectangular image (top left, bottom left, top right, bottom right.). A bias for a particular corner is defined as the average displacement of that corner, over the number of frames defined by the biasQdepth. The biasQdepth is currently set as one hundred frames and is controlled by the 'BiasQDepth' registry settings.

If there are more than 2 corners with significant bias, the reference frame is considered to be biased, and thus needs to be replaced. "Significant bias" means an average deviation, over the 'biasQdepth' number of frames, of more than 'ReferenceBiasThreshold' pixels.

To allow a plane move around in 3D space, the maximum number of points on the plane that allow to be "nailed down" in 3D is 2. In other words, for a rectangle in 3D, it is impossible to have only one corner undergoing large movement while other corners are fixed; the least number of corners allowed for movement while other corners are fixed is 2. Considering this plane being the camera image plane, it is obvious that one should use 2 corners as the threshold for detecting reference bias.

From a practical perspective, most of the camera shaking movements is rigid movements within a plane. If 2 corners have significant biases, most likely all 4 will have them too. The end result is almost identical between using 2 or 4 corners for detecting biases.

When the existing reference frame has substantial bias from its counterpart at equilibrium position, the reference bias detector will detect it and recommend a replacement when it comes.

The recommended replacement is a frame whose displacements for its all four corners are very similar to the bias from the corresponding corners of the existing reference frame.

The bias detector will examine each incoming frame until a frame is found whose biases fall below the threshold. It will then use this frame as the new reference frame. This "shift in perspective" will probably cause a detector reset.

Drift Compensation

Image Stabilization will attempt to compensate for long-term "pole drift", such as changes to the pole height and orientation caused by thermal heating and cooling over the course of a day. The following discussion describes how drift compensation works.

Image stabilization can work by taking each incoming frame, establishing a correspondence between it and a reference frame (via finding the locations of common corners in each frame, and then finding an equation that relates the two), and then transforming the incoming frame in such a way that its corners are placed in the same location they were found in, in the reference frame. This reference frame is established when a stabilization thread in a processor (for instance named CameraAPipeline) starts up and is periodically updated over time, as CameraAPipeline runs. This reference frame is called the "warm" reference frame because it changes over time. This periodic updating of the warm reference frame allows image stabilization to track changes in weather and illumination.

If thermal effects are causing the pole to move during the day, this warm reference will track these changes over time. For example, suppose thermal effects are causing the camera to "shift down" over time. If the camera is shifting down, then a given fixed point in the image is "shifting up". This given point will also appear to "shift up" as one views the warm reference frames over time.

Figure 6:
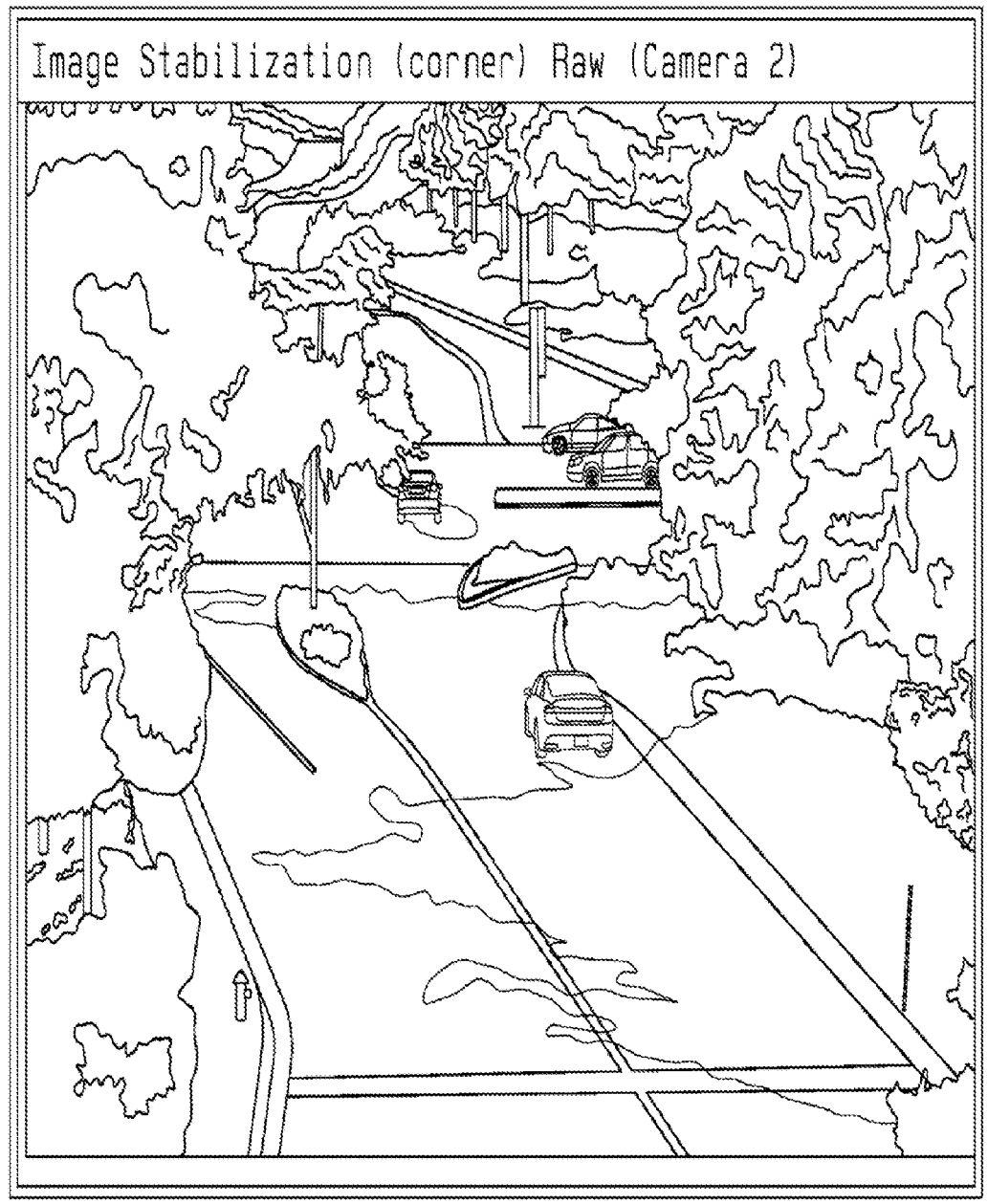
FIGS. 6-8 are images taken by a camera and displayed in accordance with an aspect of the present invention.

Similarly, if the camera is shifting "up", then drift compensation will effectively pull the image "down". Parts of this pulled-down image that do not fall within the range of the maps and LUTs, which are relative to the original base frame file, are displayed as white. For example, suppose that at a particular point in time, this is the current camera image as shown in FIG. 6.

Figure 7:
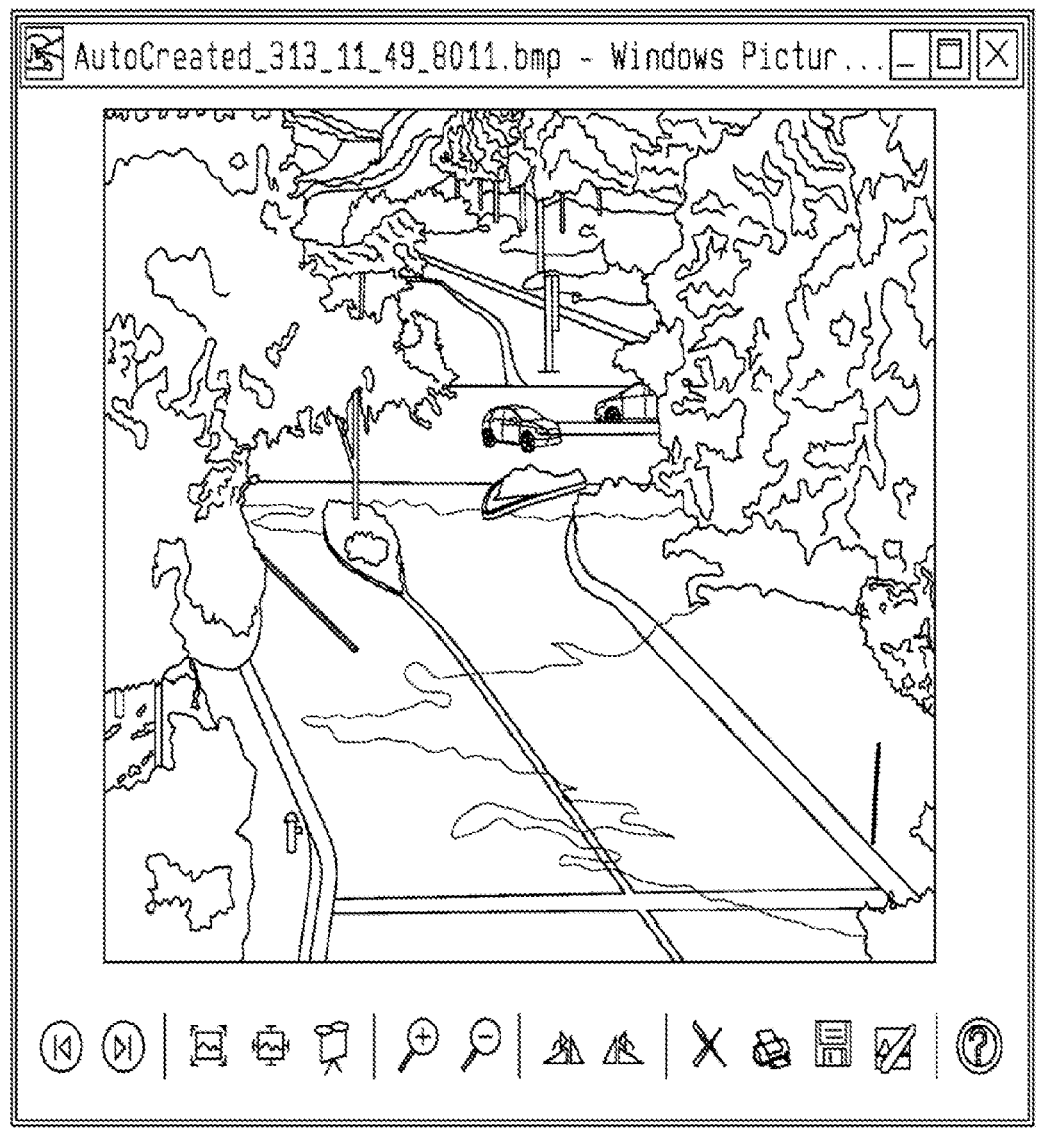
Figure 8:
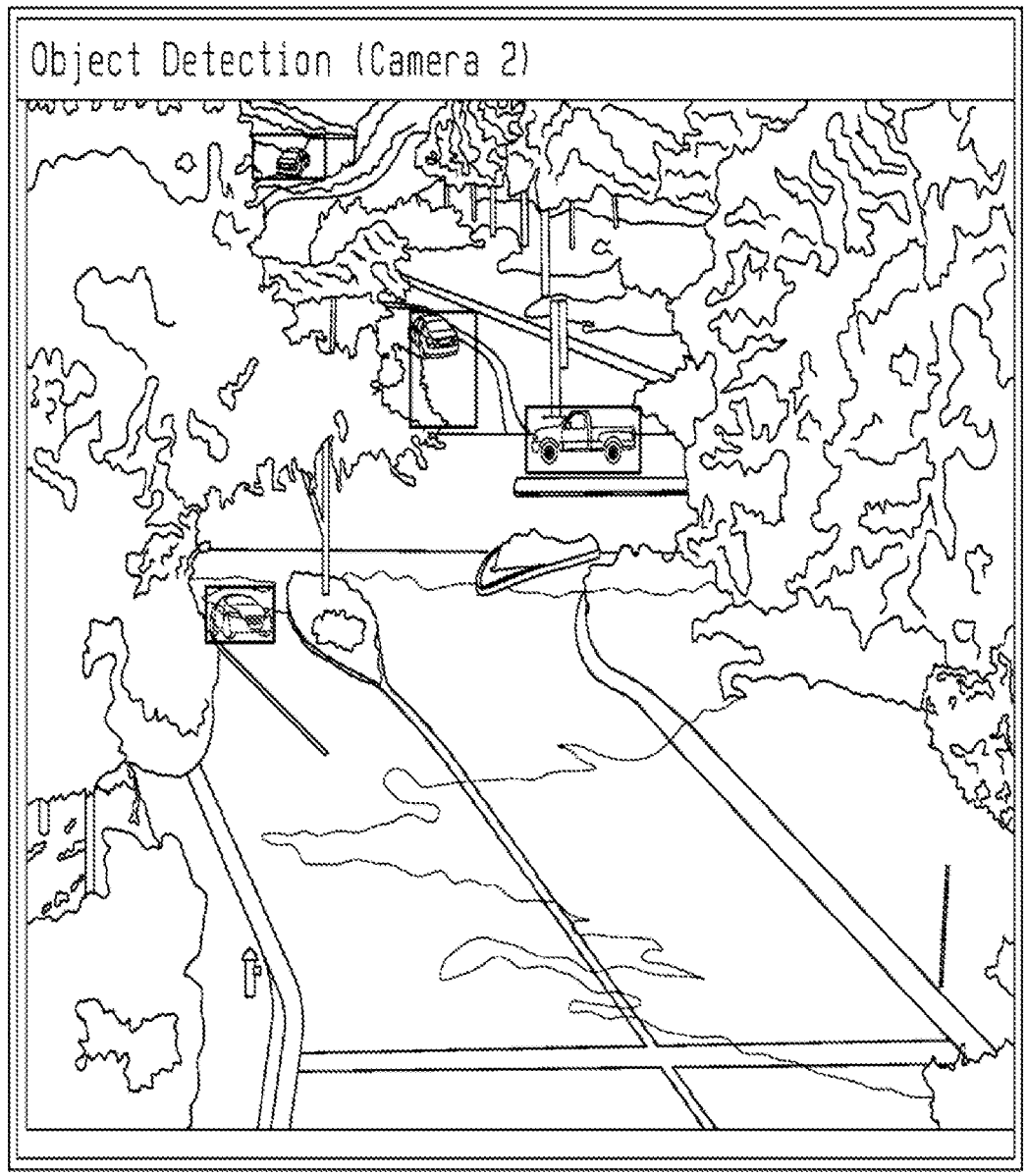

Suppose that the original base frame looks like the image as provided in FIG. 7. It is probably hard to tell, but the incoming image of FIG. 6 has been shifted up and to the right, relative to the base frame of FIG. 7. Drift compensation will pull the incoming image "down and to the left". Uncovered portions of the incoming image, which will be in the upper right, are painted white, as shown in FIG. 8. FIG. 8 also shows boxes that identify detected objects.

Another way of describing this overall process is to say that image stabilization adjusts the coordinate system of the incoming image to match the coordinate system of the warm reference frame.

When a camera is "shifting down" (or up, or rotating) over time, image stabilization will (properly) adjust the coordinate system of each incoming image to align with the current reference frame. However, the coordinate system of the warm reference frame(s) is changing over time. The problem here is that the system's maps and LUTs are only valid in one particular reference frame: the reference frame in which they were made. The reference frame in which they were made corresponds to the "base frame file" that is downloaded to CameraAPipeline along with the maps and LUTs. As pole drift pushes the coordinate system of the incoming image away from the cold coordinate system, reported object locations become progressively less accurate, classification behavior degrades (because the classification map no longer reflects the real world), and calculations assisted by the stabilization map and algorithm map are also affected. To address this problem, a correspondence between the incoming warm reference frames and the cold reference frame (in which the maps and LUTs) were made must be established.

Drift compensation is thus a second layer of image stabilization. The first layer of image stabilization maps incoming frames into the coordinate system of the warm reference frame. The second, layer maps the coordinate system of the warm reference frame to the coordinate system of the base frame file against which the maps and LUTs were made. This latter coordinate system never changes and is called the "cold reference frame".

The drift compensation method only runs when a new reference frame is established. When a new warm reference frame is established, the method computes a transformation that will map the coordinate system of the warm reference frame into the cold coordinate system of the base frame image, maps, and LUTs. This transformation is calculated by finding and matching corners, in a process similar to how the existing stabilization algorithm aligns the incoming frame to the warm reference frame. This transformation is then applied to every subsequent incoming frame, along with the per-frame transformation from incoming image to warm reference frame, to produce a final image.

Incoming Image→Warm Reference Coordinate System→Cold Coordinate System

The system must therefore be able to align each incoming warm reference frame with the cold reference frame. It may be possible to do this directly. In the event that it is not possible to create this mapping directly, drift compensation creates a database of "intermediate transformations" which it uses to help align incoming frames back to the cold reference frame.

An "intermediate transformation" is created as follows. Suppose that CameraAPipeline starts up, matches the first warm reference frame to the base frame, and starts running normally. As the sun goes down, or as conditions change, it is very possible that the appearance of the incoming warm reference frame image will "drift away" from the appearance of the base frame file. It may "drift away" so far that it may not be possible to align corners between the incoming warm reference frame and the cold reference frame. To prevent this from happening, drift compensation will notice when the appearance of the incoming warm reference frame is "drifting away" from the base frame file. "Drifting away" is calculated by noticing that the percentage of corners able to be matched between the two frames is sufficient to make a match, but only barely sufficient. If this is the case, the algorithm saves a copy of the warm reference frame and the transformation necessary to take that warm reference frame back to the cold reference frame. If subsequent warm reference frames match this saved transformation, then the incoming reference frame can be transformed back to the saved warm frame (this is called the "intermediate transformation"), and from there back to the cold frame.

In one embodiment of the present invention these intermediate transformations are stored in a computer file such as a disk file that is stored in a preset directory on a storage medium. For each saved intermediate transformation, this disk file contains the transform matrix that maps this image back to the cold reference frame, and includes the name of the .bmp file where the corresponding image is stored, and the timestamp of the last match between this image and an incoming image.

A System for Pole Drift Compensation

The methods as provided herein are, in one embodiment of the present invention, implemented on a system or a computer device. A system 1800 illustrated in FIG. 9 and as provided herein is enabled for receiving, processing and generating data. The system is provided with data that can be stored on a memory 1801. Data may be obtained from a sensor such as a camera 1811 which may be part of a plurality of cameras or may be provided from a data source. Data may be provided on an input 1806. Such data may be image data, or any other data that is helpful in a surveillance system. The processor is also provided or programmed with an instruction set or program executing the methods of the present invention is stored on a memory 1802 and is provided to the processor 1803, which executes the instructions of 1802 to process the data from 1801 or other input data. Data, such as image data or any other data provided by the processor can be outputted on an output device 1804, which may be a display to display data or a data storage device. The output device 1804 in one embodiment is a screen or display where upon the processor displays images such as video images which illustrate detected corners and/or image drift and/or a detected object. The processor also has a communication channel 1807 to receive external data from a communication device and to transmit data to an external device. The system in one embodiment of the present invention has an input device 1805, which is an input device such as a keyboard which for instance allows a user to configure the system. An input device which may also be or include a keyboard, a mouse, a pointing device, one or more cameras or any other device that can generate data to be provided to processor 1803.

Figure 9:
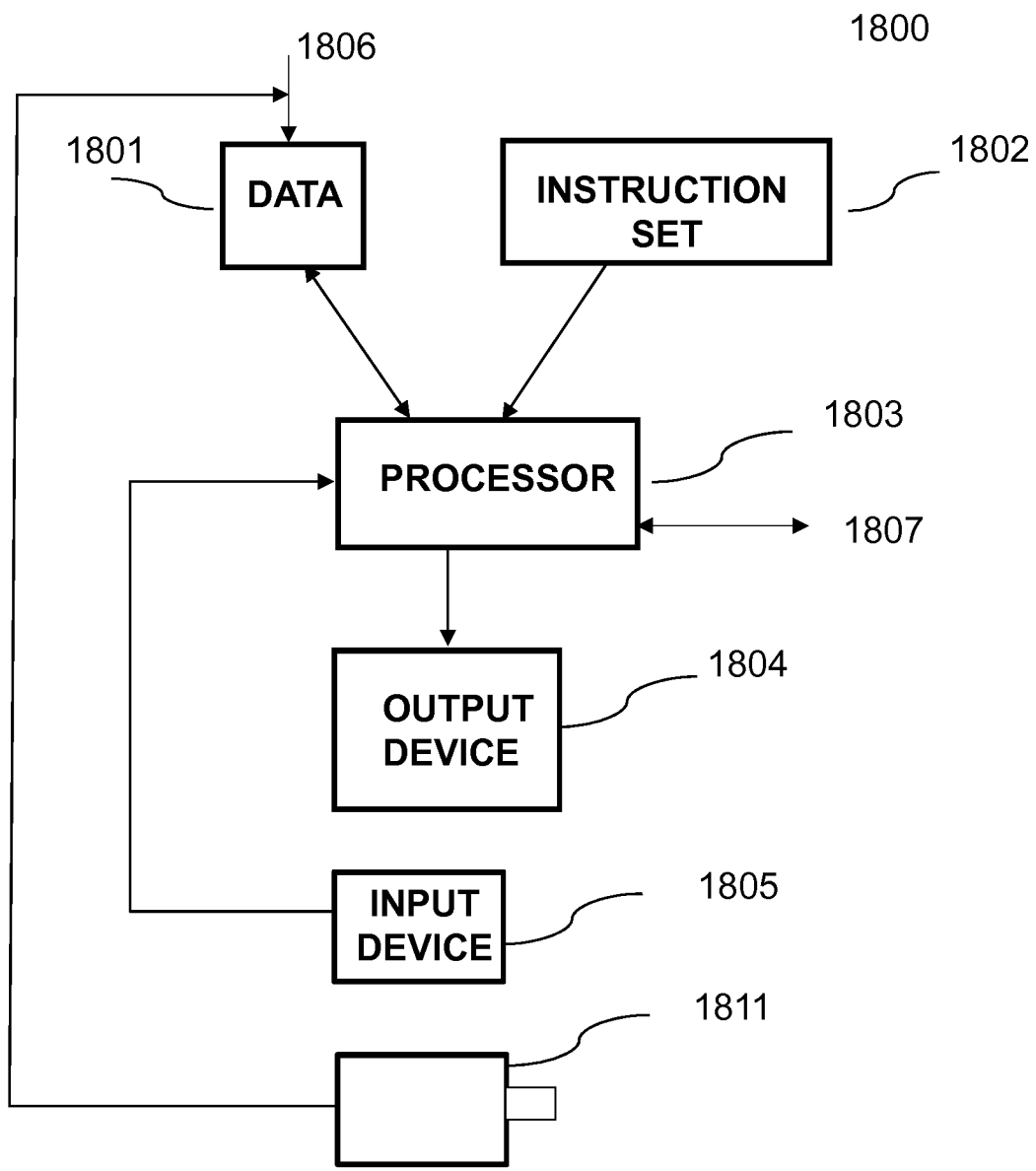
FIGS. 9 and 10 each illustrate a system in accordance with an aspect of the present invention.

The processor can be dedicated hardware. However, the processor can also be a CPU or any other computing device that can execute the instructions of 1802. Accordingly, the system as illustrated in FIG. 9 provides a system for data processing resulting from a sensor, a camera or any other data source and is enabled to execute the steps of the methods as provided herein as an aspect of the present invention.

Figure 10:
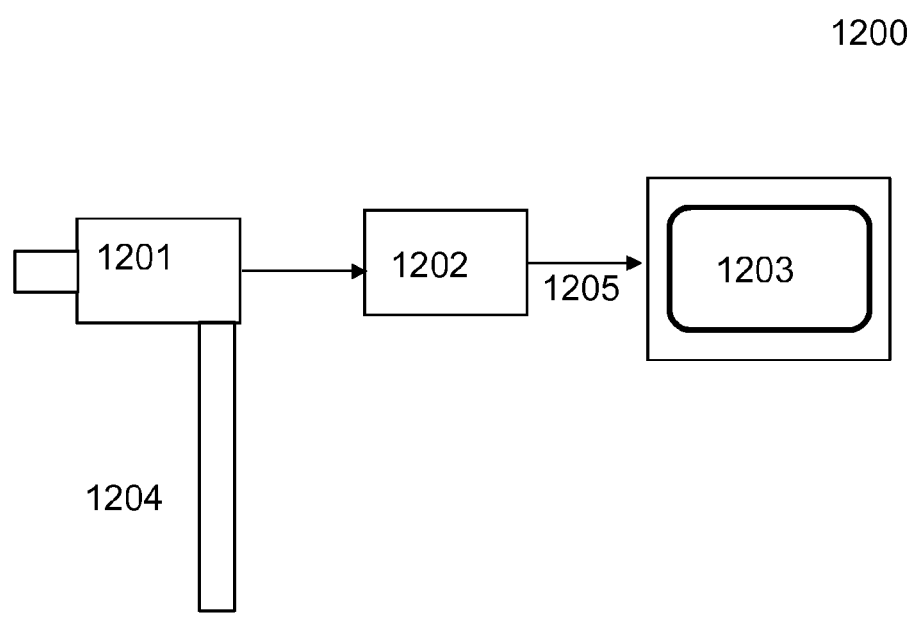

FIG. 10 shows a diagram of a system 1200 which has a camera 1201 attached to a structure 1204 which experiences short term and longer term movement that affects a stable reference frame of the camera related to its environment. A computer system 1202 which includes a processor is programmed to receive image data from the camera and process the images in accordance with one or more aspects of the present invention. The processed image data is provided via an output 1205 to a display 1203 which shows stabilized surveillance video. The stabilized video images may also be processed to detect an object or a person in the video and determine its location in the stabilized image space.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method for surveillance with a camera that is attached to a structure in a substantially fixed position relative to a ground of an environment, generating a plurality of frames, comprising:
    obtaining with the camera a base frame of a scene containing one or more objects and a processor establishing a reference coordinate system, wherein the base frame includes a plurality of detectable features;
    the processor storing in a memory a table that assigns pixel coordinates in the base frame to world coordinates in the scene;
    the processor selecting a transient frame from the plurality of frames, establishing a transient coordinate system and determining a transformation that transforms the transient coordinate system to the reference coordinate system;
    the processor transforming an incoming frame from the camera to the reference coordinate system via the transient coordinate system; and
    the processor determining world coordinates of the one or more objects in the incoming frame.

2. The method of claim 1, wherein the camera is subject to pole shake and pole drift.

3. The method of claim 1, wherein the camera is subject to pole drift.

4. The method of claim 1, wherein the processor determines that pixels representing the one or more objects in the incoming frame that have moved relative to previous frames of the scene represent the one or more objects that have not moved in the scene.

5. The method of claim 2, wherein pole shake includes a movement of the camera with a frequency between 0.1 and 10 Hz.

6. The method of claim 1, wherein the transforming by the processor of the incoming frame to the reference coordinate system via the transient coordinate system is performed by a single transformation that combines a transformation from the incoming frame to the transient coordinate system and a transformation from the transient coordinate system to the reference coordinate system.

7. The method of claim 1, wherein the processor determines the incoming frame to be a new transient frame to determine a new transient coordinate system.

8. The method of claim 1, wherein the structure experiences movement which is not larger than a field-of-vision of the camera.

9. The method of claim 1, wherein each transformation is a parameterized image-based transformation and not a camera motion parameter.

10. The method of claim 2, wherein the transient frame is unbiased with respect to pole shake.

11. A surveillance system, comprising:
   a camera that is in a attached to a structure that is in a substantially fixed position relative to a ground of an environment to generate a plurality of frames of video;
   a memory to store and retrieve data, including instructions;
   a processor in communication with the memory to retrieve instructions to perform the steps:
      processing a base frame of a scene containing one or more objects to establish a reference coordinate system, wherein the base frame includes a plurality of detectable features;
      storing in the memory a table that assigns pixel coordinates in the base frame to world coordinates in the scene;
      selecting a transient frame from the plurality of frames to establish a transient coordinate system and determining a transformation that transforms the transient coordinate system to the reference coordinate system;
      transforming an incoming frame from the camera to the reference coordinate system via the transient coordinate system; and
      determining world coordinates of the one or more objects in the incoming frame.

12. The surveillance system of claim 11, wherein the camera is subject to pole shake and pole drift.

13. The surveillance system of claim 11, wherein the camera is subject to pole drift.

14. The surveillance system of claim 11, wherein the processor determines that pixels representing the one or more objects in the incoming frame that have moved relative to previous frames of the scene represent the one or more objects that have not moved in the scene.

15. The surveillance system of claim 12, wherein pole shake includes a movement of the camera with a frequency between 0.1 and 10 Hz.

16. The surveillance system of claim 11, wherein the transforming by the processor of the incoming frame to the reference coordinate system via the transient coordinate system is performed by a single transformation that combines a transformation from the incoming frame to the transient coordinate system and a transformation from the transient coordinate system to the reference coordinate system.

17. The surveillance system of claim 11, wherein the processor determines the incoming frame to be a new transient frame to determine a new transient coordinate system.

18. The surveillance system of claim 11, wherein the structure experiences movement which is not larger than a field-of-vision of the camera.

19. The surveillance system of claim 11, wherein each transformation is a parameterized image-based transformation and not a camera motion parameter.

20. The surveillance system of claim 11, wherein the tranient frame is unbiased with respect to pole shake.

* * * * *